Patented Jan. 6, 1948

2,434,235

UNITED STATES PATENT OFFICE 2,434,235

PRODUCTION OF LAEVULOSE FROM VEGETABLE MATERIALS

Paul Vergnaud and Jean Pigeot, Melle, France, assignors to Les Usines De Melle (Societe Anonyme) Saint-Leger-les-Melle, France, a company of France No Drawing. Application May 1, 1945, Serial No. 591,426. In France April 19, 1944

Section 1, Public Law 690, August 8, 1946
Patent expires Apr. 19, 1964

9 Claims. (Cl. 127—39)

By reason of its high sweetening power (higher by 50 per cent than that of saccharose) and its capability of use in dietetics, laevulose is likely to find important openings. Laevulose is known to be available in numerous tubers or roots in the form of complex more or less defined glucids (particularly inuline), the hydrolytic degradation of which produces laevulose admixed with other reducing sugars such as glucose.

The methods known up to this time for production of laevulose include the following steps:

1. Extracting juice

This is performed by pressure, diffusion or maceration, and always yields a juice which is more or less polluted with solid impurities but also contains numerous other impurities, particularly protidic substances, besides complex glucids, in solution or colloidal suspension.

2. Hydrolysis of glucids

It is performed by simultaneously applying a suitable temperature and adjusting the pH-value to a suitable figure, which are kept for some time. The juice is then neutralized and cooled.

3. Separating laevulose

The simplest method for isolating laevulose from the mixture of reducing sugars thus obtained consists in using the property (described by Dubrunfaut in Annales de Chimie et de Physique 1847, vol. 21, page 169) exhibited by laevulose to yield with alkaline-earth bases, little soluble compounds termed laevulosates and capable of being separated through the agency of mechanical means. A concentrated lime-milk is generally employed.

The laevulosate is then washed and decomposed by adding an acid, preferably one capable of yielding an insoluble or little soluble alkaline-earth salt which, after filtration leaves a pure laevulose solution; the latter needs only be concentrated after decolourization if necessary.

Although the aforesaid method resorts but to reactions known for a long time, it has in actual practice met difficulties which have been a bar as yet to economical working. As a matter of fact, the impurities present in vegetable juices in the form of suspension or colloidal solution, particularly albuminoid or protidic substances, are flocculable by alkaline-earth bases; should they not be removed thoroughly before lime treatment, an impure laevulosate is obtained and its purification through the agency of usual mechanical means is very difficult; besides, partial peptization of impurities during subsequent decomposition of laevulosate leads to laevulose syrups of mediocre purity, which is detrimental to their taste and their ability to crystallize out.

Heat and acids act together during hydrolysis to cause flocculation of a part of impurities but such a purification has been found insufficient.

It has been proposed to defecate hydrolyzed juices by adding an amount of lime which just suffices to flocculate impurities but is insufficient to precipitate laevulosates and corresponds to a pH-value between 7 and 7.5; however in such a case, it is not possible to filter and purification is not complete even when further mechanical means such as centrifugalization are brought into play.

It has also been proposed to start from previously dried material which would be advantageous in causing irreversible flocculation of certain albuminoid substances and facilitating coagulation of the remaining impurities during clarification of juices. Now, this entails a large consumption of steam, and the efficiency of the method is not altogether satisfactory.

We have found that the difficulties experienced in removing impurities are ascribable to the fact that said impurities, during hydrolysis of glucids and by reason of combined actions of acidity and heat, suffer a hydrolytic degradation leading to simpler molecules related to those of albumoses and peptones and which are only partially coagulable by alkaline-earth bases, so that mechanical separation by usual means such as filtrations and centrifugalization becomes impossible.

It is an object of our invention, in view of the foregoing discovery, to provide a method whereby vegetable juices can be purified satisfactorily.

According to this invention, before hydrolysis, we cause temperature and acidity separately to act on juices in carefully selected conditions. As a matter of fact, we have found that in absence of any acid, heat precipitates a part of protidic materials which then become adapted for mechanical separation, for instance through centrifugalization, while addition of acid at a low temperature causes a further flocculation of impurities which are likewise adapted for mechanical separation. By properly selecting temperature conditions and pH-values in these separate steps, we obtain a sufficiently purified juice which yields a substantially pure laevulosate after hydrolysis.

The temperature may vary within wide apart limits, e. g. between 80 and 120° C. according to the character of the juices, but it is essential that it is caused to act with sufficiently high pH-values, preferably above 4; the original pH-value of vegetable juices is generally fit without special adjustment. Action takes place substantially instantaneously.

As to acidity, it may vary within wide apart limits for pH-value, e. g. between 1 and 3 according to the cases, but the temperature should be kept sufficiently low, e. g. below 50°. There is also a substantially instantaneous action.

In each specific case, optima conditions as concerns temperature in the first step and pH-value in the second step may be ascertained by previous tests.

The pH-value selected for flocculation is also generally suitable for subsequent hydrolysis of glucids within a relatively short time and at a temperature which does not cause destruction of laevulose. Nevertheless it is within the ambit of our invention to alter the pH-value in either direction after separating the flocculate and before hydrolysis. Any mineral or organic acid capable of bringing about the best pH-value may be used.

The flocculates may be separated after each one of the successive actions or at one time.

Heat treatment may be performed during extraction proper which may then be carried out at the flocculation temperature or at a higher temperature provided it is effected in absence of any acid.

It is also possible, within the ambit of this invention to perform flocculations in reverse order, i. e. causing first acidity then temperature to act. In this instance, acid action may take place during extraction, provided the latter is effected at a low temperature in so far as this is feasible with the starting material in use. Acidity will then be neutralized partly, and followed with heating to complete precipitation of impurities.

Finally, our method may be performed not only with vegetable materials containing laevulosanes as main glucids but also with any starting material or by-product, wherein glucids comprise or yield upon hydrolysis a proportion of laevulose sufficient to justify extraction, whenever said materials contain impurities capable of being flocculated by separate actions of acids and temperature. Such are for instance natural starting materials having a high saccharose content, e. g. beetroots, sugar-canes, manioc, sorghum, most fruit, and by products from agricultural or industrial treatment of said materials.

Our invention may be carried out as follows:

The juice obtained from diffusion, maceration or compression of the starting material is freed from coarse solid impurities, for instance by sifting; after being neutralized if need be, it is brought to flocculation temperature. After cooling to ordinary temperature, acid is added to the juice by sufficient amount to cause a further flocculation; mineral acids, particularly sulphuric acid, are preferred. The combined flocculates are separated, for instance through centrifugalization or any other known means. The substantially limpid liquid is brought back if necessary to a suitable pH-value then hydrolyzed by heating to an extent so controlled as to obtain a mixture of reducing sugars without substantial destruction of laevulose.

The liquid is cooled and neutralized either simultaneously or successively; in the latter case, the sequence of operations is immaterial. As a neutralizing agent we preferably use excess calcium carbonate which enables of neutralizing with accuracy and produces calcium sulphate easily separable together with excess carbonate.

The foregoing steps may be carried out with a minimum consumption of heat if counter-current heat-economisers are used for heating and cooling liquids.

Clarified juice is then treated in accordance with known practice, i. e. subjected continuously or by batches to action of a concentrated lime-milk at ordinary temperature or a slightly lower temperature. Precipitated laevulosate is washed, then suspended in water and decomposed, preferably by means of carbon dioxide. Lime carbonate produced from decomposed laevulosate may advantageously be used for neutralization after hydrolysis. Finally, the filtered solution of laevulosate is concentrated, after decolourization and neutralization if need be.

The following example which has no limitative character will better show how our invention may be carried out:

1000 litres of juices obtained by pressing Jerusalem artichokes and potentially containing 149 kg. of reducing sugars were heated to 100° C., whereby a part of impurities were flocculated, then immediately cooled to about 30° C. by means of a heat-economiser. 18.5 kg. of sulphuric acid of 60° Bé. were then stirred into the liquid, causing a further flocculation. The mass was centrifugalized, and the clarified liquid, having a pH-value of 1.5, was brought to 80° C. by means of a heat-economiser, and kept at said temperature for an hour. 50 kg. of calcium carbonate (dry-weight) produced from carbonatation of laevulose in a prior batch, were added; the mass was filtered, and the liquid cooled by passing non-hydrolyzed juice then cold water at 15° C., in counter-current. We thus obtained about 1000 litres of a solution containing 112.5 kg. of laevulose and 32.5 kg. of glucose, i. e. 96.7 per cent of reducing sugars potentially available in original juice.

We then precipitated laevulosate in a vessel having a capacity of 2,000 litres and provided with efficient stirring means and a cooling device, by gradually and simultaneously introducing laevulose solution and 300 litres of lime-milk of 26° Bé., free from carbonate, the rates of supply being so selected that the operation is ended within 45 minutes, temperature being kept at about 15° C. The suspension of crystalline laevulosate was passed through a filter-press then the laevulosate was washed. The filtering and washing operation took about an hour.

The laevulosate was at last suspended in 800 litres of water wherein carbon dioxide was introduced while stirring vigourously. We obtained a solution containing 89.4 kg. of laevulose which it is only necessary to separate from calcium carbonate.

The yield amounted to 60 per cent of reducing sugars in the original juice and 79.5 per cent of laevulose subjected to precipitation. The filtrate together with waters from washing was treated in hot condition with 2 kg. of decolorizing black, and after filtration and concentration under a reduced pressure, yielded 105 kg. of syrup containing 85 per cent of laevulose. The syrup was very little coloured and limpid; it possessed a very high sweetening power and was free from any foreign taste.

We have also found that it is extremely advantageous for economic purposes to append the plant for producing laevulose to an already existing distillery. The latter will divert a part of its starting materials towards laevulose production while the laevulose manufacture plant will forward to the distillery its by-products, i. e. sugar solutions free from laevulose, waters from laevulosate washing and even flocculates, for converting sugars contained therein into alcohol.

While we have described what we deem to be efficient and reliable embodiments of our invention, we do not wish to be limited thereto as many alterations may be brought about without departing from the scope of the appended claims.

What we claim is:

1. In the manufacture of laevulose from a liquor containing complex glucids of the inuline type, the method which comprises in combination the separately performed steps of heating said liquor at a pH-value above 4 to a temperature of about 80 to 120° C., and adding to said liquor at a temperature below 50° C. such an amount of acid as to build up a pH-value of 1 to 3, thereby producing flocculates in each step, then the steps of removing said flocculates from the liquor and hydrolysing said liquor.

2. The method of producing laevulose from a liquor containing complex glucids of the inuline type, which comprises the combined but separately performed steps of heating said liquor at a pH value above 4 to a temperature of about 80 to 120° C. and adding to said liquor at a temperature below 50° C. such an amount of acid as to build up a pH-value of 1 to 3, thereby producing flocculates in each step, removing said flocculates from the liquor, and heating said liquor at a pH of 1 to 3 to a temperature of about 80 to 100° C. so as to produce in said liquor a mixture of reducing sugars including laevulose.

3. The method of claim 2, which further comprises the combined steps of cooling and neutralizing the liquor containing reducing sugars.

4. The method of claim 2, which further comprises the combined steps of cooling and neutralizing the liquor containing reducing sugars by means of excess calcium carbonate.

5. The method of claim 1, said acid being a mineral acid.

6. The method of claim 1, said acid being sulphuric acid.

7. The method of producing laevulose, which comprises heating Jerusalem artichoke juice to a temperature of about 100° C., cooling said juice to about 30° C., adding sulphuric acid to build up a pH-value between 1 and 3, centrifugalizing said juice to obtain a clarified liquid, heating said liquid to about 80° C. for about an hour, adding excess calcium carbonate to said liquid, filtering said liquid, cooling it, and adding lime milk thereto.

8. A process for producing a purified liquor suitable for the manufacture of laevulose through hydrolysis from a vegetable material containing complex glucids of the inuline type which comprises separating juice from said material at a temperature of about 80 to 120° C., so as to produce a liquor containing a flocculate; removing said flocculate from said liquor; rapidly cooling said liquor to a temperature below 50° C.; acidifying said cooled liquor to a pH-value of 1 to 3, so as to produce a second flocculate; and removing said second flocculate from said liquor.

9. A process for producing a purified liquor suitable for the manufacture of laevulose through hydrolysis from a vegetable material containing complex glucids of the inuline type, which comprises separating juice from said material at a temperature below 50° C. in the presence of so much acid as to obtain a liquor having a pH-value of 1 to 3 and containing a flocculate; removing said flocculate from said liquor; neutralizing said liquor at least partly so as to raise the pH-value of said liquor above 4; heating said liquor at a temperature of about 80 to 120° C. so as to produce a second flocculate therein; and removing said second flocculate from said liquor.

PAUL VERGNAUD.
JEAN PIGEOT.

REFERENCES CITED

The following references are of record in the file of this patent:

UNITED STATES PATENTS

| Number | Name | Date |
| --- | --- | --- |
| 1,616,166 | Arsem | Feb. 1, 1927 |
| 1,663,233 | Arsem | Mar. 20, 1928 |
| 1,663,234 | Arsem | Mar. 20, 1928 |

FOREIGN PATENTS

| Number | Country | Date |
| --- | --- | --- |
| 16,546 | Great Britain | 1904 |